(12) United States Patent
Zhu et al.

(10) Patent No.: US 10,552,979 B2
(45) Date of Patent: Feb. 4, 2020

(54) OUTPUT OF A NEURAL NETWORK METHOD FOR DEEP ODOMETRY ASSISTED BY STATIC SCENE OPTICAL FLOW

(71) Applicant: TUSIMPLE, San Diego, CA (US)

(72) Inventors: Wentao Zhu, San Diego, CA (US); Yi Wang, San Diego, CA (US); Yi Luo, San Diego, CA (US)

(73) Assignee: TUSIMPLE, San Diego, CA (US)

( * ) Notice: Subject to any disclaimer, the term of this patent is extended or adjusted under 35 U.S.C. 154(b) by 0 days.

(21) Appl. No.: 15/703,885

(22) Filed: Sep. 13, 2017

(65) Prior Publication Data

US 2019/0080470 A1 Mar. 14, 2019

(51) Int. Cl.
*G05D 1/02* (2006.01)
*G06K 9/32* (2006.01)
*G06T 7/55* (2017.01)
*G06T 7/73* (2017.01)

(52) U.S. Cl.
CPC ............ *G06T 7/74* (2017.01); *G05D 1/0253* (2013.01); *G06K 9/3233* (2013.01); *G06T 7/55* (2017.01); *G06K 2209/401* (2013.01); *G06T 2207/10016* (2013.01); *G06T 2207/30252* (2013.01)

(58) Field of Classification Search
CPC ... G06T 7/74; G06T 7/55; G06T 2207/10016; G06T 2207/30252; G05D 1/0253; G06K 9/3233; G06K 2209/401
See application file for complete search history.

(56) References Cited

U.S. PATENT DOCUMENTS

| 6,535,114 | B1 | 3/2003 | Suzuki et al. |
| 6,777,904 | B1 | 8/2004 | Degner et al. |
| 6,975,923 | B2 | 12/2005 | Spriggs |
| 7,103,460 | B1 | 9/2006 | Breed |
| 7,689,559 | B2 | 3/2010 | Canright |
| 7,742,841 | B2 | 6/2010 | Sakai et al. |
| 7,783,403 | B2 | 8/2010 | Breed |

(Continued)

FOREIGN PATENT DOCUMENTS

| CN | 103984915 A | 8/2014 |
| CN | 105518744 A | 4/2016 |

(Continued)

OTHER PUBLICATIONS

P. Fischer, FlowNet: Learning Optical Flow with Convolutional Networks, arXiv:1504.06852[cs.CV], Apr. 26, 2015 (Year: 2015).*

(Continued)

*Primary Examiner* — Brenda C Bernardi
(74) *Attorney, Agent, or Firm* — Perkins Coie LLP

(57) ABSTRACT

A method of visual odometry for a non-transitory computer readable storage medium storing one or more programs is disclosed. The one or more programs includes instructions, which when executed by a computing device, causes the computing device to perform the following steps comprising: performing data alignment among sensors including a LiDAR, cameras and an IMU-GPS module; collecting image data and generating point clouds; processing, in the IMU-GPS module, a pair of consecutive images in the image data to recognize pixels corresponding to a same point in the point clouds; and establishing an optical flow for visual odometry.

16 Claims, 11 Drawing Sheets

(56) References Cited

U.S. PATENT DOCUMENTS

| | | | |
|---|---|---|---|
| 7,844,595 B2 | 11/2010 | Canright |
| 8,041,111 B1 | 10/2011 | Wilensky |
| 8,064,643 B2 | 11/2011 | Stein |
| 8,082,101 B2 | 12/2011 | Stein |
| 8,164,628 B2 | 4/2012 | Stein |
| 8,175,376 B2 | 5/2012 | Marchesotti |
| 8,271,871 B2 | 9/2012 | Marchesotti |
| 8,346,480 B2 | 1/2013 | Trepagnier et al. |
| 8,378,851 B2 | 2/2013 | Stein |
| 8,392,117 B2 | 3/2013 | Dolgov |
| 8,401,292 B2 | 3/2013 | Park |
| 8,412,449 B2 | 4/2013 | Trepagner et al. |
| 8,478,072 B2 | 7/2013 | Aisaka |
| 8,553,088 B2 | 10/2013 | Stein |
| 8,706,394 B2 | 4/2014 | Trepagnier et al. |
| 8,718,861 B1 | 5/2014 | Montemerlo et al. |
| 8,788,134 B1 | 7/2014 | Litkouhi et al. |
| 8,908,041 B2 | 12/2014 | Stein |
| 8,917,169 B2 | 12/2014 | Schofield |
| 8,963,913 B2 | 2/2015 | Baek |
| 8,965,621 B1 | 2/2015 | Urmson et al. |
| 8,981,966 B2 | 3/2015 | Stein |
| 8,983,708 B2 | 3/2015 | Choe et al. |
| 8,993,951 B2 | 3/2015 | Schofield |
| 9,002,632 B1 | 4/2015 | Emigh |
| 9,008,369 B2 | 4/2015 | Schofield |
| 9,025,880 B2 | 5/2015 | Perazzi |
| 9,042,648 B2 | 5/2015 | Wang |
| 9,088,744 B2 | 7/2015 | Grauer et al. |
| 9,111,444 B2 | 8/2015 | Kaganovich |
| 9,117,133 B2 | 8/2015 | Barnes |
| 9,117,147 B2 | 8/2015 | Frazier |
| 9,118,816 B2 | 8/2015 | Stein |
| 9,120,485 B1 | 9/2015 | Dolgov |
| 9,122,954 B2 | 9/2015 | Srebnik |
| 9,134,402 B2 | 9/2015 | Sebastian |
| 9,145,116 B2 | 9/2015 | Clarke |
| 9,147,255 B1 | 9/2015 | Zhang |
| 9,156,473 B2 | 10/2015 | Clarke |
| 9,176,006 B2 | 11/2015 | Stein |
| 9,179,072 B2 | 11/2015 | Stein |
| 9,183,447 B1 | 11/2015 | Gdalvahu |
| 9,185,360 B2 | 11/2015 | Stein |
| 9,191,634 B2 | 11/2015 | Schofield |
| 9,214,084 B2 | 12/2015 | Grauer et al. |
| 9,219,873 B2 | 12/2015 | Grauer et al. |
| 9,233,659 B2 | 1/2016 | Rosenbaum |
| 9,233,688 B2 | 1/2016 | Clarke |
| 9,248,832 B2 | 2/2016 | Huberman |
| 9,248,835 B2 | 2/2016 | Tanzmeister |
| 9,251,708 B2 | 2/2016 | Rosenbaum |
| 9,277,132 B2 | 3/2016 | Berberian |
| 9,280,711 B2 | 3/2016 | Stein |
| 9,282,144 B2 | 3/2016 | Tebay et al. |
| 9,286,522 B2 | 3/2016 | Stein |
| 9,297,641 B2 | 3/2016 | Stein |
| 9,299,004 B2 | 3/2016 | Lin |
| 9,315,192 B1 | 4/2016 | Zhu |
| 9,317,033 B2 | 4/2016 | Ibanez-guzman et al. |
| 9,317,776 B1 | 4/2016 | Honda |
| 9,330,334 B2 | 5/2016 | Lin |
| 9,342,074 B2 | 5/2016 | Dolgov et al. |
| 9,347,779 B1 | 5/2016 | Lynch |
| 9,355,635 B2 | 5/2016 | Gao |
| 9,365,214 B2 | 6/2016 | Shalom |
| 9,418,549 B2 | 8/2016 | Kang et al. |
| 9,428,192 B2 | 8/2016 | Schofield |
| 9,436,880 B2 | 9/2016 | Bos |
| 9,438,878 B2 | 9/2016 | Niebla |
| 9,443,163 B2 | 9/2016 | Springer |
| 9,446,765 B2 | 9/2016 | Shalom |
| 9,459,515 B2 | 10/2016 | Stein |
| 9,466,006 B2 | 10/2016 | Duan |
| 9,476,970 B1 | 10/2016 | Fairfield |
| 9,490,064 B2 | 11/2016 | Hirosawa |
| 9,494,935 B2 | 11/2016 | Okumura et al. |
| 9,507,346 B1 | 11/2016 | Levinson et al. |
| 9,513,634 B2 | 12/2016 | Pack et al. |
| 9,531,966 B2 | 12/2016 | Stein |
| 9,535,423 B1 | 1/2017 | Debreczeni |
| 9,538,113 B2 | 1/2017 | Grauer et al. |
| 9,547,985 B2 | 1/2017 | Tuukkanen |
| 9,549,158 B2 | 1/2017 | Grauer et al. |
| 9,555,803 B2 | 1/2017 | Pawlicki |
| 9,568,915 B1 | 2/2017 | Berntorp et al. |
| 9,599,712 B2 | 3/2017 | Van Der Tempel et al. |
| 9,600,889 B2 | 3/2017 | Boisson et al. |
| 9,602,807 B2 | 3/2017 | Crane et al. |
| 9,620,010 B2 | 4/2017 | Grauer et al. |
| 9,625,569 B2 | 4/2017 | Lange |
| 9,628,565 B2 | 4/2017 | Stenneth et al. |
| 9,649,999 B1 | 5/2017 | Amireddy et al. |
| 9,690,290 B2 | 6/2017 | Prokhorov |
| 9,701,023 B2 | 7/2017 | Zhang et al. |
| 9,712,754 B2 | 7/2017 | Grauer et al. |
| 9,720,418 B2 | 8/2017 | Stenneth |
| 9,723,097 B2 | 8/2017 | Harris et al. |
| 9,723,099 B2 | 8/2017 | Chen et al. |
| 9,723,233 B2 | 8/2017 | Grauer et al. |
| 9,726,754 B2 | 8/2017 | Massanell et al. |
| 9,729,860 B2 | 8/2017 | Cohen et al. |
| 9,738,280 B2 | 8/2017 | Rayes |
| 9,739,609 B1 | 8/2017 | Lewis |
| 9,746,550 B2 | 8/2017 | Nath et al. |
| 9,753,128 B2 | 9/2017 | Schweizer et al. |
| 9,753,141 B2 | 9/2017 | Grauer et al. |
| 9,754,490 B2 | 9/2017 | Kentley et al. |
| 9,760,837 B1 | 9/2017 | Nowozin et al. |
| 9,766,625 B2 | 9/2017 | Boroditsky et al. |
| 9,769,456 B2 | 9/2017 | You et al. |
| 9,773,155 B2 | 9/2017 | Shotton et al. |
| 9,779,276 B2 | 10/2017 | Todeschini et al. |
| 9,785,149 B2 | 10/2017 | Wang et al. |
| 9,805,294 B2 | 10/2017 | Liu et al. |
| 9,810,785 B2 | 11/2017 | Grauer et al. |
| 9,823,339 B2 | 11/2017 | Cohen |
| 9,870,624 B1* | 1/2018 | Narang ............... G06T 7/521 |
| 9,953,236 B1 | 4/2018 | Huang et al. |
| 9,971,352 B1* | 5/2018 | Mudalige ............ G05D 1/0253 |
| 10,147,193 B2 | 12/2018 | Huang et al. |
| 2004/0239756 A1 | 12/2004 | Aliaga et al. |
| 2006/0188131 A1 | 8/2006 | Zhang et al. |
| 2007/0070069 A1* | 3/2007 | Samarasekera ......... G06F 3/011 |
| | | 345/427 |
| 2007/0230792 A1 | 10/2007 | Shashua |
| 2008/0144925 A1* | 6/2008 | Zhu ..................... G06K 9/32 |
| | | 382/154 |
| 2008/0249667 A1 | 10/2008 | Horvits et al. |
| 2009/0040054 A1 | 2/2009 | Wang et al. |
| 2009/0208106 A1 | 8/2009 | Dunlop |
| 2010/0049397 A1 | 2/2010 | Liu et al. |
| 2010/0067745 A1 | 3/2010 | Kovtun |
| 2010/0204964 A1* | 8/2010 | Pack ..................... G06T 7/521 |
| | | 703/1 |
| 2010/0226564 A1 | 9/2010 | Marchesotti |
| 2010/0281361 A1 | 11/2010 | Marchesotti |
| 2010/0305755 A1* | 12/2010 | Heracles ............. G06K 9/4671 |
| | | 700/253 |
| 2010/0315505 A1* | 12/2010 | Michalke ............. G06T 7/251 |
| | | 348/118 |
| 2011/0206282 A1 | 8/2011 | Aisaka |
| 2011/0282622 A1* | 11/2011 | Canter ............... G06K 9/00691 |
| | | 702/150 |
| 2012/0105639 A1 | 5/2012 | Stein |
| 2012/0106800 A1 | 5/2012 | Khan |
| 2012/0140076 A1 | 6/2012 | Rosenbaum |
| 2012/0170801 A1 | 7/2012 | De Oliveira et al. |
| 2012/0274629 A1 | 11/2012 | Baek |
| 2012/0281904 A1 | 11/2012 | Gong et al. |
| 2013/0182909 A1 | 7/2013 | Rodriguez-Serrano |
| 2013/0298195 A1 | 11/2013 | Liu |
| 2014/0145516 A1 | 5/2014 | Hirosawa |
| 2014/0198184 A1 | 7/2014 | Stein |
| 2014/0270484 A1 | 9/2014 | Chandraker et al. |

(56) References Cited

U.S. PATENT DOCUMENTS

| | | |
|---|---|---|
| 2015/0062304 A1 | 3/2015 | Stein |
| 2015/0353082 A1 | 12/2015 | Lee |
| 2016/0037064 A1 | 2/2016 | Stein |
| 2016/0055237 A1 | 2/2016 | Tuzel |
| 2016/0094774 A1 | 3/2016 | Li |
| 2016/0129907 A1 | 5/2016 | Kim |
| 2016/0165157 A1 | 6/2016 | Stein |
| 2016/0210528 A1 | 7/2016 | Duan |
| 2016/0266256 A1* | 9/2016 | Allen .................. G01S 17/89 |
| 2016/0292867 A1 | 10/2016 | Martini |
| 2016/0321381 A1 | 11/2016 | English et al. |
| 2016/0334230 A1 | 11/2016 | Ross et al. |
| 2016/0350930 A1 | 12/2016 | Lin et al. |
| 2016/0375907 A1 | 12/2016 | Erban |
| 2017/0053412 A1 | 2/2017 | Shen et al. |
| 2017/0213134 A1* | 7/2017 | Beyeler .................. G06N 3/088 |
| 2017/0277197 A1* | 9/2017 | Liao .................. G05D 1/0253 |
| 2017/0301111 A1* | 10/2017 | Zhao .................. G06T 7/80 |
| 2018/0046187 A1* | 2/2018 | Martirosyan .......... G05D 1/0094 |
| 2018/0047147 A1* | 2/2018 | Viswanathan ..... G06K 9/00798 |
| 2018/0053056 A1 | 2/2018 | Rabinovich |
| 2018/0121762 A1 | 5/2018 | Han |
| 2018/0136660 A1* | 5/2018 | Mudalige .............. G05D 1/021 |
| 2018/0137633 A1* | 5/2018 | Chang .................. G06F 17/15 |
| 2018/0157918 A1* | 6/2018 | Levkova ............ G06K 9/00791 |
| 2018/0232906 A1 | 8/2018 | Kim |
| 2018/0239969 A1* | 8/2018 | Lakehal-ayat ....... G05D 1/0246 |
| 2018/0260956 A1 | 9/2018 | Huang et al. |
| 2018/0365835 A1 | 12/2018 | Yan et al. |
| 2019/0079534 A1 | 3/2019 | Zhu et al. |
| 2019/0236393 A1 | 8/2019 | Wang et al. |
| 2019/0259176 A1 | 8/2019 | Dai |

FOREIGN PATENT DOCUMENTS

| | | |
|---|---|---|
| CN | 105574505 A | 5/2016 |
| CN | 106096568 A | 11/2016 |
| CN | 106971178 A | 7/2017 |
| EP | 1754179 A1 | 2/2007 |
| EP | 2448251 A2 | 5/2012 |
| EP | 2463843 A2 | 6/2012 |
| EP | 2463843 A3 | 7/2013 |
| EP | 2579211 A2 | 10/2013 |
| EP | 2761249 A1 | 8/2014 |
| EP | 2463843 B1 | 7/2015 |
| EP | 2448251 A3 | 10/2015 |
| EP | 2946336 A2 | 11/2015 |
| EP | 299365 A1 | 3/2016 |
| EP | 3081419 A1 | 10/2016 |
| WO | WO2005098739 A1 | 10/2005 |
| WO | WO2005098751 A1 | 10/2005 |
| WO | WO2005098782 A1 | 10/2005 |
| WO | WO2010109419 A1 | 9/2010 |
| WO | WO2013045612 A1 | 4/2013 |
| WO | WO2014111814 A2 | 7/2014 |
| WO | WO2014111814 A3 | 7/2014 |
| WO | WO2014201324 A1 | 12/2014 |
| WO | WO2015083009 A1 | 6/2015 |
| WO | WO2015103159 A1 | 7/2015 |
| WO | WO2015125022 A2 | 8/2015 |
| WO | WO201518600 A1 | 12/2015 |
| WO | WO2015186002 A3 | 12/2015 |
| WO | WO2016135736 A2 | 9/2016 |
| WO | WO2017013875 A1 | 1/2017 |
| WO | WO2018015716 A1 | 1/2018 |

OTHER PUBLICATIONS

Deep Convolutional Neural Network for Image Deconvolution, Li Xu et al., p. 1-9, 2014, retrieved from the internet at https://papers.nips.cc/paper/5485-deep-convolutional-neural-network-for-image-deconvolution.pdf. (Year: 2014).*

Athanasiadis, Thanos et al., "Semantic Image Segmentation and Object Labeling", IEEE Transactions on Circuits and Systems for Video Technology, vol. 17, No. 3, Mar. 2007.

Cordts, Marius et al. The Cityscapes Dataset for Semantic Urban Scene Understanding, Proceedings of the IEEE Computer Society Conference on Computer Vision and Pattern Recognition {CVPR), Las Vegas, Nevada, 2016.

Dai, Jifeng et al., (Microsoft Research), "Instance-aware Semantic Segmentation via Multi-task Network Cascades", CVPR 2016.

Fischer, et al. Flownet: Learning Optical Flow with Convolutional Networks. arXiv preprint arXiv:1504.06852. May 4, 2015.

Gould, et al. "Decomposing a Scene into Geometric and Semantically Consistent Regions," 2009 IEEE 12th International Conference on Computer Vision (ICCV), 2009 (Year: 2009).

Geiger, Andreas et al., "Automatic Camera and Range Sensor Calibration using a single Shot", Robotics and Automation (ICRA), pp. 1-8, 2012 IEEE International Conference.

Guameri, P. et al. "A Neural-Network-Based Model for the Dynamic Simulation of the Tire/Suspension System While Traversing Road Irregularities," in IEEE Transactions on Neural Networks, vol. 19, No. 9, pp. 1549-1563, Sep. 2008.

Hou, Xiaodi and Zhang, Liqing, "Dynamic Visual Attention: Searching for Coding Length Increments", Advances in Neural Information Processing Systems, vol. 21, pp. 681-688, 2008.

Hou, Xiaodi and Zhang, Liqing, "Saliency Detection: A Spectral Residual Approach", Computer Vision and Pattern, CVPR'07—IEEE Conference, pp. 1-8, 2007.

Hou, Xiaodi and Zhang, Liqing, "Thumbnail Generation Based on Global Saliency", Advances in Cognitive Neurodynamics, ICCN 2007, pp. 999-1003, Springer Netherlands, 2008.

Hou, Xiaodi et al. "Color Conceptualization", Proceedings of the 15th ACM International Conference on Multimedia, pp. 265-268, ACM, 2007.

Hou, Xiaodi et al., "Boundary Detection Benchmarking: Beyond F-Measures", Computer Vision and Pattern Recognition, CVPR'13, vol. 2013, pp. 1-8, IEEE, 2013.

Hou, Xiaodi et al., "A Mela-Theory of Boundary Detection Benchmarks", arXiv preprint, rXiv:1302 5985, 2013.

Hou, Xiaodi et al., "A Time-Dependent Model of Information Capacity of Visual Attention", International Conference on Neural Information Processing, pp. 127-136, Springer Berlin Heidelberg, 2006.

Hou, Xiaodi et al., "Image Signature: Highlighting Sparse Salient Regions", IEEE Transactions on Pattern Analysis and Machine Intelligence, vol. 34, No. 1, pp. 194-201, 2012.

Hou, Xiaodi, "Computational Modeling and Psychophysics in Low and Mid-Level Vision", California Institute of Technology, 2014.

Huval, Brody et al. "An Empirical Evaluation of Deep Learning on Highway Driving", arXiv:1504 01716v3 [cs.RO] Apr. 17, 2015.

International Application No. PCT/US19/35207, International Search Report and Written Opinion dated Aug. 22, 2019.

International Application No. PCT/US2018/037644, International Search Report and Written Opinion dated Nov. 22, 2018.

Jain, Suyong Dutt, Grauman, Kristen, "Active Image Segmentation Propagation", In Proceedings of the IEEE Conference on Computer Vision and Pattern Recognition {CVPR), Las Vegas, Jun. 2016.

Kendall, Alex, Gal, Yarin, "What Uncertainties Do We Need in Bayesian Deep Learning for Computer Vision", rXiv:1703 04977v1 [cs CV] Mar. 15, 2017.

Levinson, Jesse et al., *Experimental Robotics, Unsupervised Calibration for Multi-Beam Lasers*, pp. 179-194, 12th Ed., Oussama Khatib, Vijay Kumar, Gaurav Sukhatme (Eds.) Springer-Verlag Berlin Heidelberg 2014.

Ihou, Bolei and Hou, Xiaodi and Zhang, Liqing, "A Phase Discrepancy Analysis of Object Motion", Asian Conference on Computer Vision, pp. 225-238, Springer Berlin Heidelberg, 2010.

Li, Yanghao and Wang, Naiyan and Liu, Jiaying and Hou, Xiaodi, "Demystifying Neural Style Transfer", arXiv preprint, rXiv:1701 01036, 2017.

Li, Yanghao and Wang, Naiyan and Liu, Jiaying and Hou, Xiaodi, "Factorized Bilinear Models for Image Recognition", rXiv preprint arXiv:1611 05709, 2016.

(56) References Cited

OTHER PUBLICATIONS

Li, Yanghao et al., "Revisiting Batch Normalization for Practical Domain Adaptation", arXiv preprint arXiv:1603.04779, 2016.
Li, Yin et al., "The Secrets of Salient Object Segmentation", Proceedings of the IEEE Conference on Computer Vision and Pattern Recognition, pp. 280-287, 2014.
MacAodha, Oisin, et al., "Hierarchical Subquery Evaluation for Active 19 earning on a Graph", In Proceedings of the IEEE Conference on Computer Vision and Pattern Recognition (CVPR), 2014.
Nang, Panqu et al., "Understanding Convolution for Semantic Segmentation", arXiv preprint arXiv:1702.08502, 2017.
Office Action from Chinese Application No. 201711313905.4, dated Mar. 27, 2019.
Paszke, Adam et al. Enet: A deep neural network architecture for real-lime semantic segmentation. CoRR, abs/1606 02147, 2016.
Ramos, Sebastian et al., "Detecting Unexpected Obstacles or Self-Driving Cars: Fusing Deep Learning and Geometric Modeling", arXiv:1612 06573v1 [cs.CV] Dec. 20, 2016.
Richter, Stephan R. et al., "Playing for Data: Ground Truth from Computer Sames", Intel Labs, European Conference on Computer Vision (ECCV), Amsterdam, the Netherlands, 2016.
Schroff, Florian et al. (Google), "FaceNet: A Unified Embedding for Face Recognition and Clustering", CVPR 2015.
Spinello, Luciano, et al., "Multiclass Multimodal Detection and Tracking in Urban Environments", Sage Journals, vol. 29 issue: 12, pp. 1498-1515 Article first published online: Oct. 7, 2010; issue published: Oct. 1, 2010.
Wei, Junqing et al. "A Prediction- and Cost Function-Based Algorithm for Robust Autonomous Freeway Driving", 2010 IEEE Intelligent Vehicles Symposium, University of California, San Diego, USA, Jun. 21-24, 2010.
Welinder, P. et al. "The Multidimensional Wisdom of Crowds"; http://NWW.vision.caltechedu/visipedia/papers/WelinderEtalNIPS10.pdf 2010.
Xu, Li et al. Deep Convolutional Neural Network for Image Deconvolution, p. 1-9, (2014) [retrieved from the internet at https://papers.nips .cc/paper/5485-deep-convolutional-neural-network-for-i mage-deconvolution. pdf. (Year: 2014) ].
Yang et al., "Dense Captioning with Joint Interference and Visual Context," IEEE Conference on Computer Vision and Pattern Recognition (CVPR), vol. 2, 2017 (Year: 2017).
Yang, C. et al., "Neural Network-Based Motion Control of an Underactuated Wheeled Inverted Pendulum Model," in IEEE Transactions on Neural Networks and Learning Systems, vol. 25, No. 11, pp. 2004-2016, Nov. 2014.
Yu, Kai et al., "Large-scale Distributed Video Parsing and Evaluation Platform", Center for Research on Intelligent Perception and Computing, Institute of Automation, Chinese Academy of Sciences, China, arXiv:1611 09580v1 [cs CV] Nov. 29, 2016.
Zhang, Z. et al. A Flexible new technique for camera calibration. IEEE Transactions on Pattern Analysis and Machine Intelligence (vol. 22 , Issue: 11 , Nov. 2000).
Farenza, M. et al., "Person Re-identification by Symmetry-Driven Accumulation of Local Feature," IEEE Conference on Computer Vision and Patter Recognition, pp. 2360-2367, Dec. 31, 2010.
Ahmed, Ejaz et al. An Improved Deep Learning Architecture for person re-identification. IEEE Conference on Computer Vision and Pattern Recognition, pp. 3908-3916 Jun. 12, 2015.
Khan, Furqan M. et la. Multi-Shot Person Re-Identification Using Part Appearance Mixture, IEEE Winter Conference on Applications of Computer Vision, pp. 605-614, Mar. 31, 2017.
Zheng, L. et al., "Scalable Person Re-identification: A Benchmark," 2015 IEEE International Conference on Computer Vision (ICCV), Santiago, 2015, pp. 1116-1124.
N. McLaughlin, N. et al. "Recurrent Convolutional Network for Video-Based Person Re-identification," 2016 IEEE Conference on Computer Vision and Pattern Recognition (CVPR), Las Vegas, NV, 2016, pp. 1325-1334.

\* cited by examiner

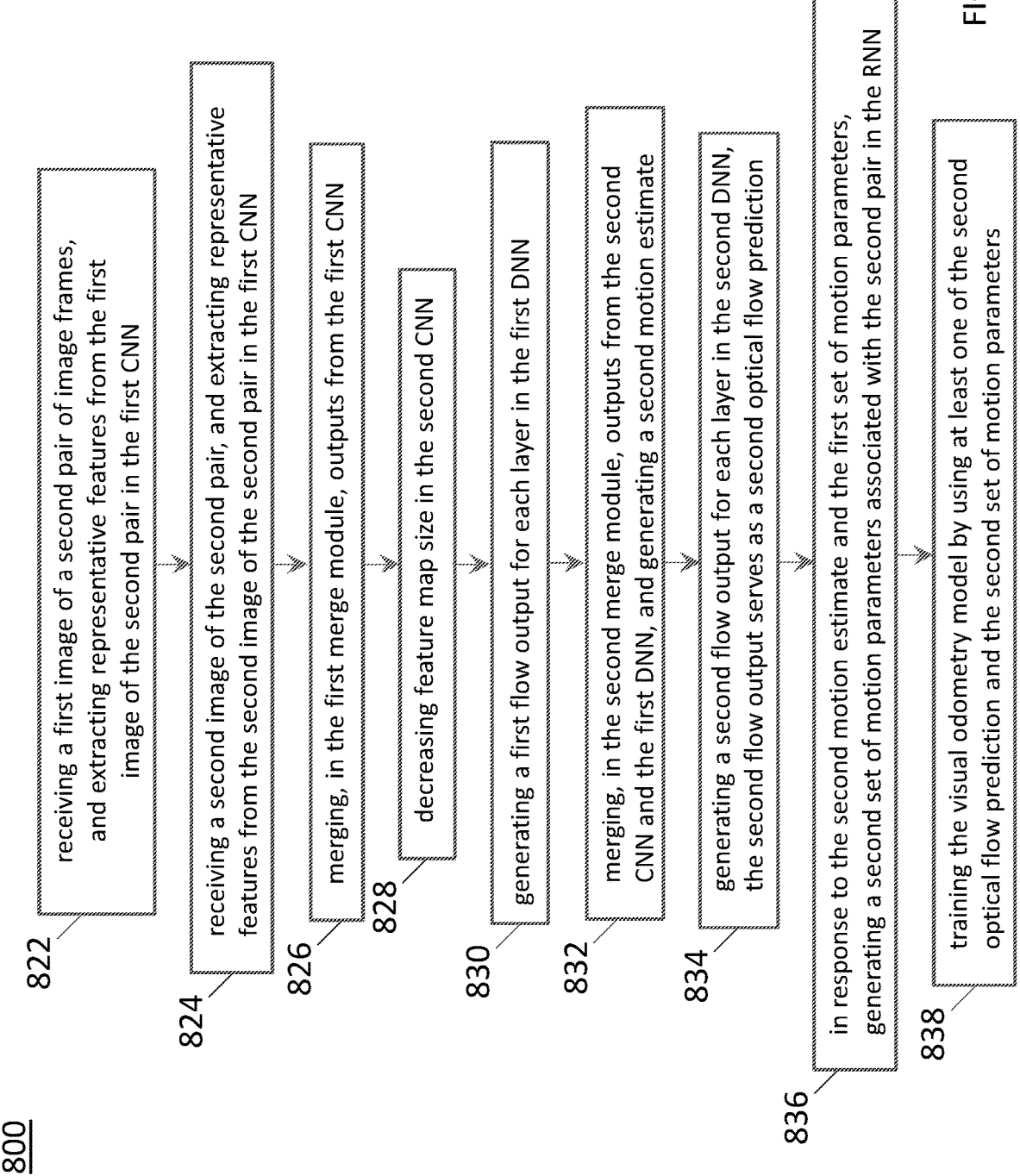

OUTPUT OF A NEURAL NETWORK METHOD FOR DEEP ODOMETRY ASSISTED BY STATIC SCENE OPTICAL FLOW

PRIORITY/RELATED DOCUMENTS

This patent application incorporates by reference in their entireties and claims priority to these co-pending patent applications filed on Sep. 13, 2017, including the following: (1) "Data Acquisition and Input of Neural Network Method for Deep Odometry Assisted by Static Scene Optical Flow;" (2) "Data Acquisition and Input of Neural Network System for Deep Odometry Assisted by Static Scene Optical Flow;" (3) "Neural Network Architecture Method for Deep Odometry Assisted by Static Scene Optical Flow;" (4) "Neural Network Architecture System for Deep Odometry Assisted by Static Scene Optical Flow;" (5) "Output of a Neural Network System for Deep Odometry Assisted by Static Scene Optical Flow;" (6) "Training and Testing of a Neural Network Method for Deep Odometry Assisted by Static Scene Optical Flow;" and (7) "Training and Testing of a Neural Network System for Deep Odometry Assisted by Static Scene Optical Flow," and all with the same inventor(s).

FIELD OF THE DISCLOSURE

The field of the disclosure is in general related to autonomous vehicles and, in particular, to a method and system for deep odometry assisted by static scene optical flow.

BACKGROUND OF THE DISCLOSURE

In recent years, an increasing amount of interest and research effort has been put toward intelligent or autonomous vehicles. With the continuous progress in autonomous technology, robot sensors are generating increasing amounts of real-world data. Autonomous vehicle research is highly dependent on the vast quantities of real-world data for development, testing and validation of algorithms before deployment on public roads. However, the cost of processing and analyzing these data, including developing and maintaining a suitable autonomous vehicle platform, regular calibration and data collection procedures, and storing the collected data, is so high that few research groups can manage it. Following the benchmark-driven approach of the computer vision community, a number of vision-based autonomous driving datasets have been released. Some existing datasets, however, may not be well generalized to different environments. Moreover, hand-crafted features may be employed to extract keypoints and descriptors, and find matching points to solve motion parameters. Such feature-based methods fail when a scene has no salient keypoints.

BRIEF SUMMARY OF THE DISCLOSURE

Various objects, features, aspects and advantages of the present embodiment will become more apparent from the following detailed description of embodiments of the embodiment, along with the accompanying drawings in which like numerals represent like components.

Embodiments of the present disclosure provide a method of visual odometry for a non-transitory computer readable storage medium storing one or more programs. The one or more programs includes instructions, which when executed by a computing device, causes the computing device to perform the following steps comprising: performing data alignment among sensors including a LiDAR, cameras and an IMU-GPS module; collecting image data and generating point clouds; processing a pair of consecutive images in the image data to recognize pixels corresponding to a same point in the point clouds; and establishing an optical flow for visual odometry.

In an embodiment, the method further includes: receiving a first image of a first pair of image frames, and extracting representative features from the first image of the first pair in a first convolution neural network (CNN); and receiving a second image of the first pair, and extracting representative features from the second image of the first pair in the first CNN.

In another embodiment, the method further includes: merging, in the first merge module, outputs from the first CNN; and decreasing feature map size in a second CNN.

In yet another embodiment, the method further includes: generating a first flow output for each layer in a first deconvolution neural network (DNN).

In still another embodiment, the method further includes: merging, in a second merge module, outputs from the second CNN and the first DNN, and generating a first motion estimate.

In yet still another embodiment, the method further includes: generating a second flow output for each layer in a second DNN, the second flow output serves as a first optical flow prediction.

In still yet another embodiment, the method further includes: in response to the first motion estimate, generating a first set of motion parameters associated with the first pair in a recurrent neural network (RNN).

In a further embodiment, the method further includes: training the visual odometry model by using at least one of the first optical flow prediction and the first set of motion parameters.

In an embodiment, the method further includes: receiving a first image of a second pair of image frames, and extracting representative features from the first image of the second pair in the first CNN; and receiving a second image of the second pair, and extracting representative features from the second image of the second pair in the first CNN.

In another embodiment, the method further includes: merging, in the first merge module, outputs from the first CNN; and decreasing feature map size in the second CNN.

In yet another embodiment, the method further includes: generating a first flow output for each layer in the first DNN.

In still another embodiment, the method further includes: merging, in the second merge module, outputs from the second CNN and the first DNN, and generating a second motion estimate.

In yet still another embodiment, the method further includes: generating a second flow output for each layer in the second DNN, the second flow output serves as a second optical flow prediction.

In still yet another embodiment, the method further includes: in response to the second motion estimate and the first set of motion parameters, generating a second set of motion parameters associated with the second pair in the RNN.

In a further embodiment, the method further includes: training the visual odometry model by using at least one of the second optical flow prediction and the second set of motion parameters.

BRIEF DESCRIPTION OF THE DRAWINGS

It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

FIGS. 8A and 8B are flow diagrams showing a method of visual odometry, in accordance with a still further embodiment.

DETAILED DESCRIPTION OF THE EMBODIMENTS

Figure 1:
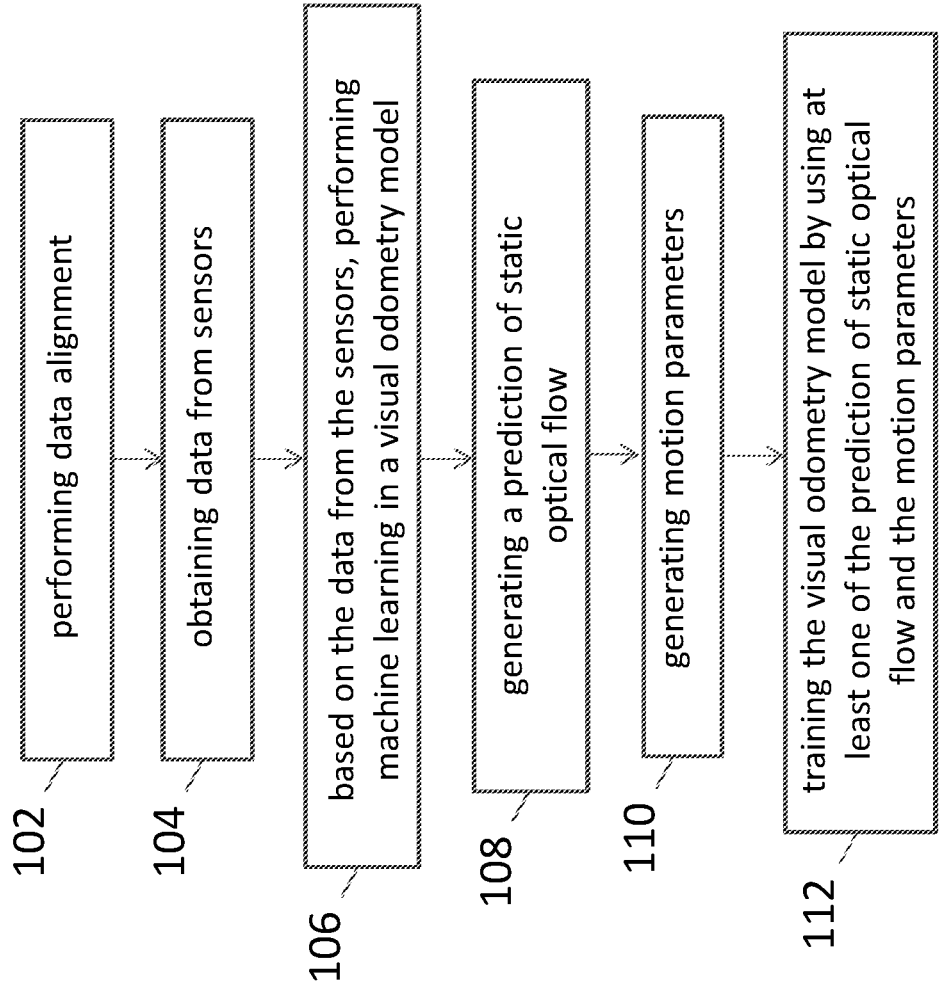
FIG. 1 is a flow diagram showing a method of visual odometry, in accordance with an embodiment.

The embodiment and its various embodiments can now be better understood by turning to the following detailed description of the embodiments, which are presented as illustrated examples of the embodiment defined in the claims. It is expressly understood that the embodiment as defined by the claims may be broader than the illustrated embodiments described below.

Any alterations and modifications in the described embodiments, and any further applications of principles described in this document are contemplated as would normally occur to one of ordinary skill in the art to which the disclosure relates. Specific examples of components and arrangements are described below to simplify the present disclosure. These are, of course, merely examples and are not intended to be limiting. For example, when an element is referred to as being "connected to" or "coupled to" another element, it may be directly connected to or coupled to the other element, or intervening elements may be present.

In the drawings, the shape and thickness may be exaggerated for clarity and convenience. This description will be directed in particular to elements forming part of, or cooperating more directly with, an apparatus in accordance with the present disclosure. It is to be understood that elements not specifically shown or described may take various forms. Reference throughout this specification to "one embodiment" or "an embodiment" means that a particular feature, structure, or characteristic described in connection with the embodiment is included in at least one embodiment.

In the drawings, the figures are not necessarily drawn to scale, and in some instances the drawings have been exaggerated and/or simplified in places for illustrative purposes. One of ordinary skill in the art will appreciate the many possible applications and variations of the present disclosure based on the following illustrative embodiments of the present disclosure.

The appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. It should be appreciated that the following figures are not drawn to scale; rather, these figures are merely intended for illustration.

It will be understood that singular forms "a", "an" and "the" are intended to include the plural forms as well, unless the context clearly indicates otherwise. Furthermore, relative terms, such as "bottom" and "top," may be used herein to describe one element's relationship to other elements as illustrated in the Figures.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Many alterations and modifications may be made by those having ordinary skill in the art without departing from the spirit and scope of the embodiment. Therefore, it must be understood that the illustrated embodiment has been set forth only for the purposes of example and that it should not be taken as limiting the embodiment as defined by the following claims. For example, notwithstanding the fact that the elements of a claim are set forth below in a certain combination, it must be expressly understood that the embodiment includes other combinations of fewer, more, or different elements, which are disclosed herein even when not initially claimed in such combinations.

The words used in this specification to describe the embodiment and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims therefore include not only the combination of elements which are literally set forth, but all equivalent structure, material or acts for performing substantially the same function in substantially the same way to obtain substantially the same result.

In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Reference is now made to the drawings wherein like numerals refer to like parts throughout.

As used herein, the term "wireless" refers to wireless communication to a device or between multiple devices. Wireless devices may be anchored to a location and/or hardwired to a power system, depending on the needs of the business, venue, event or museum. In one embodiment, wireless devices may be enabled to connect to Internet, but do not need to transfer data to and from Internet in order to communicate within the wireless information communication and delivery system.

As used herein, the term "Smart Phone" or "smart phone" or "mobile device(s)" or "cellular phone" or "cellular" or "mobile phone" or the like refers to a wireless communication device, that includes, but not is limited to, an integrated circuit (IC), chip set, chip, system-on-a-chip including low noise amplifier, power amplifier, Application Specific Integrated Circuit (ASIC), digital integrated circuits, a transceiver, receiver, or transmitter, dynamic, static or non-transitory memory device(s), one or more computer processor(s) to process received and transmitted signals, for example, to and from the Internet, other wireless devices, and to provide communication within the wireless information communication and delivery system including send, broadcast, and receive information, signal data, location data, a bus line, an antenna to transmit and receive signals, and power supply such as a rechargeable battery or power storage unit. The chip or IC may be constructed ("fabricated") on a "die" cut from, for example, a Silicon, Sapphire, Indium Phosphide, or Gallium Arsenide wafer. The IC may be, for example, analogue or digital on a chip or hybrid combination thereof. Furthermore, digital integrated circuits may contain anything from one to thousands or millions of signal invertors, and logic gates, e.g., "and", "or", "nand" and "nor gates", flipflops, multiplexors, etc., on a square area that occupies only a few millimeters. The small size of, for instance, IC's allows these circuits to provide high speed operation, low power dissipation, and reduced manufacturing cost compared with more complicated board-level integration.

As used herein, the terms "wireless", "wireless data transfer," "wireless tracking and location system," "positioning system" and "wireless positioning system" refer without limitation to any wireless system that transfers data or communicates or broadcasts a message, which communication may include location coordinates or other information using one or more devices, e.g., wireless communication devices.

As used herein, the terms "module" or "modules" refer without limitation to any software, software program(s), firmware, or actual hardware or combination thereof that has been added on, downloaded, updated, transferred or originally part of a larger computation or transceiver system that assists in or provides computational ability including, but not limited to, logic functionality to assist in or provide communication broadcasts of commands or messages, which communication may include location coordinates or communications between, among, or to one or more devices, e.g., wireless communication devices.

FIG. 1 is a flow diagram showing a method 100 of visual odometry, in accordance with an embodiment.

In some embodiments in accordance with the present disclosure, a non-transitory, i.e., non-volatile, computer readable storage medium is provided. The non-transitory computer readable storage medium is stored with one or more programs. When the program is executed by the processing unit of a computing device, i.e., that are part of a vehicle, the computing device is caused to conduct specific operations set forth below in accordance with some embodiments of the present disclosure.

Figure 9:
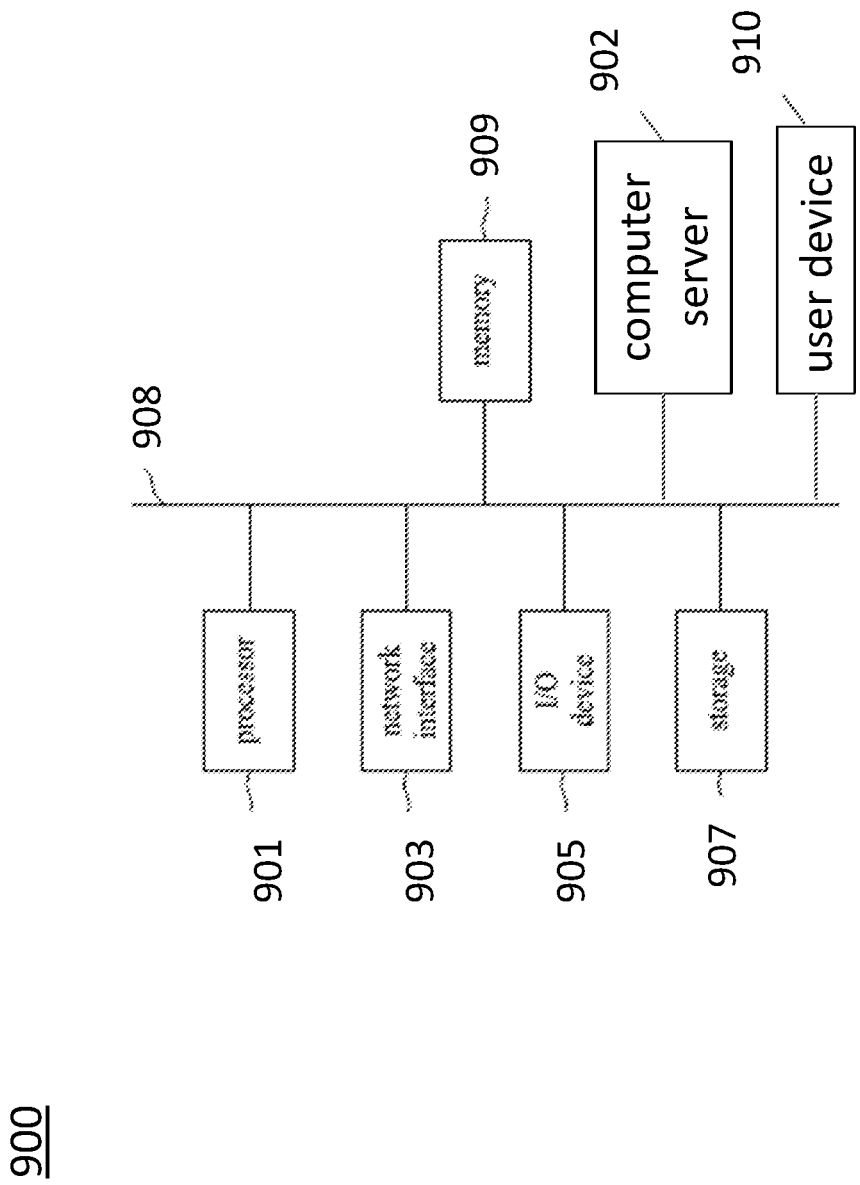
FIG. 9 is a block diagram of a system for generating a ground truth dataset for motion planning, in accordance with some embodiments.

In some embodiments, as illustrated in FIG. 9, examples of non-transitory storage computer readable storage medium may include magnetic hard discs, optical discs, floppy discs, flash memories, or forms of electrically programmable memories (EPROM) or electrically erasable and programmable (EEPROM) memories. In certain embodiments, the term "non-transitory" may indicate that the storage medium is not embodied in a carrier wave or a propagated signal. In some embodiments, a non-transitory storage medium may store data that can, over time, change (e.g., in RAM or cache).

In some embodiments in accordance with the present disclosure, in operation, a client application is transmitted to the computing device upon a request of a user, for example, by a smart phone 910 (see FIG. 9). For example, the first client device 910 may be a smart phone downloading the application from a computer server. In operation, the application is installed at the vehicle. Accordingly, specific functions may be executed by the user through a computing device, such as calibrating sensors and time synchronization, and, for example, sending and receiving calibration files for data alignment purposes.

In particular, referring to FIG. 1, in operation 102, data alignment, which includes sensor calibration and time synchronization, is performed. A vehicle is equipped with multiple complementary sensors which require calibration in order to represent sensed information in a common coordinate system. In an embodiment, sensors employed in the method include a light detection and ranging (LiDAR) sensor, one or more cameras such as monocular cameras or stereo cameras, and an inertial navigation module. The LiDAR sensor and the cameras are mounted on the roof of the vehicle. LiDAR sensors have become increasingly common in both industrial and robotic applications. LIDAR sensors are particularly desirable for their direct distance measurements and high accuracy. In an embodiment according to the present disclosure, the LIDAR sensor is equipped with many simultaneous rotating beams at varying angles, for example, a 64-beam rotating LiDAR. The multiple-beam LiDAR provides at least an order of magnitude more data than a single-beam LiDAR and enables new applications in mapping, object detection and recognition, scene understanding, and simultaneous localization and mapping (SLAM).

The inertial navigation module in an embodiment according to the present disclosure includes a global navigation satellite system (GNSS)-inertial measurement unit (IMU) module or an IMU-global positioning system (GPS) module. The GNSS satellite signals are used to correct or calibrate a solution from the IMU. The benefits of using GNSS with an IMU are that the IMU may be calibrated by the GNSS signals and that the IMU can provide position and angle updates at a quicker rate than GNSS. For high dynamic vehicles, IMU fills in the gaps between GNSS positions. Additionally, GNSS may lose its signal and the IMU can continue to compute the position and angle during the period of lost GNSS signal. The two systems are complementary and are often employed together. An integrated navigation system consisting of IMU and GPS is usually preferred due to the reduced dependency on GPS-only navigator in an area prone to poor signal reception or affected by multipath. The performance of the integrated system largely depends upon the quality of the IMU and the integration methodology. Considering the restricted use of high grade IMU and their associated price, low-cost IMUs are becoming the preferred choice for civilian navigation purposes. MEMS based inertial sensors have made possible the development of civilian land vehicle navigation as it offers small size and low-cost.

The data alignment among the sensors includes calibrating intrinsic parameters of the camera, and calibrating extrinsic parameters between the camera and the inertial navigation module. Moreover, transformation between the inertial navigation module and LiDAR coordinate may be achieved by a method similar to that described in "*Unsupervised Calibration for Multi-beam Lasers*" by Levinson, Jesse and Sebastian Thrun, *Experimental Robotics*, Springer Berlin Heidelberg, 2014. Modifications made in the method 100 include, for example, the intrinsic parameters of each beam are calibrated in advance using a supervised method. Also, LiDAR scans are collected in the form of sweep. A sweep is defined as a scan coverage of the LiDAR sensor rotating from 0 degree to 360 degrees. Moreover, motion distortion within the sweep is corrected assuming that the angular and linear velocity of the LiDAR motion is constant. In an embodiment, means for alleviating motion distortion is employed for points of LiDAR to ensure every point in the same sweep of LiDAR has an identical timestamp.

It is assumed that the environment is generally static and contains some 3D features, i.e., it is not just smooth ground. In order to achieve an accurate calibration, LiDAR measurements are recorded as the vehicle transitions through a series of known poses. Global pose information is irrelevant, as there is no existing map, so only local pose information is required. Local pose data may be acquired in any number of ways, e.g. from a wheel encoder and IMU, from an integrated GPS/IMU system, or from a GPS system with real-time corrections.

Furthermore, transformation between the cameras and the LiDAR coordinate may be calibrated using a method similar to that described in "Automatic Camera and Range Sensor Calibration Using a Single Shot" by Geiger, Andreas, et al., Robotics and Automation (ICRA), 2012 IEEE International Conference on. IEEE, 2012. Modifications made in the method 100 include, for example, the intrinsic parameters of the cameras are calibrated in advance using a method described in "A Flexible New Technique for Camera Calibration" by Z. Zhang, *IEEE Transactions on Pattern Analysis and Machine Intelligence*, 22(11):1330-1334, 2000. Also, the cameras include monocular cameras, which are calibrated by multiple shots instead of single shot. Moreover, registration is made by minimizing reprojection error and translation norm.

In addition to the calibration and transformation, time synchronization among the LiDAR sensor, cameras and inertial navigation module is achieved. Specifically, time synchronization between the LiDAR sensor and the inertial navigation module, between the inertial navigation module and the cameras, and between the LiDAR sensor and the cameras is achieved. In an embodiment, a time trigger is used to synchronize the LiDAR and cameras to ensure data alignment.

After data alignment is performed, in operation 104, these sensors are used to collect data in an environment. In an embodiment, images of the environment are captured by the cameras in approximately 30 Hz. LiDAR scans are collected in the form of a sweep in approximately 20 Hz. Vehicle poses, including position and orientation, are collected in an "east north up" (ENU) coordinate by the inertial navigation module in approximately 50 Hz.

In operation 106, based on the data from the sensors, machine learning is performed in a visual odometry model.

Inputs to the visual odometry model for machine learning include images obtained by the cameras and point clouds obtained by the LiDAR. In an embodiment, for monocular cameras, consecutive RGB image frames in pairs are input. In another embodiment, for stereo cameras, RGB images with depth information (RGB-D) are input. In machine learning, convolutional neural networks (CNNs) have become popular in many fields of computer vision. CNN has been widely applied to classification, and recently presented architectures also allow for per-pixel predictions like semantic segmentation or depth estimation from single images. In an embodiment, as will be further discussed, a method of training CNNs end-to-end to learn predicting an optical flow field from a pair of images is disclosed.

In operation 108, a prediction of static optical flow for a pair of input image frames is generated. Moreover, in operation 110, a set of motion parameters for estimating a motion between the pair of input image frames is generated.

Subsequently, in operation 112, the visual odometry model is trained by using at least one of the prediction of static optical flow and the motion parameters.

Figure 2:
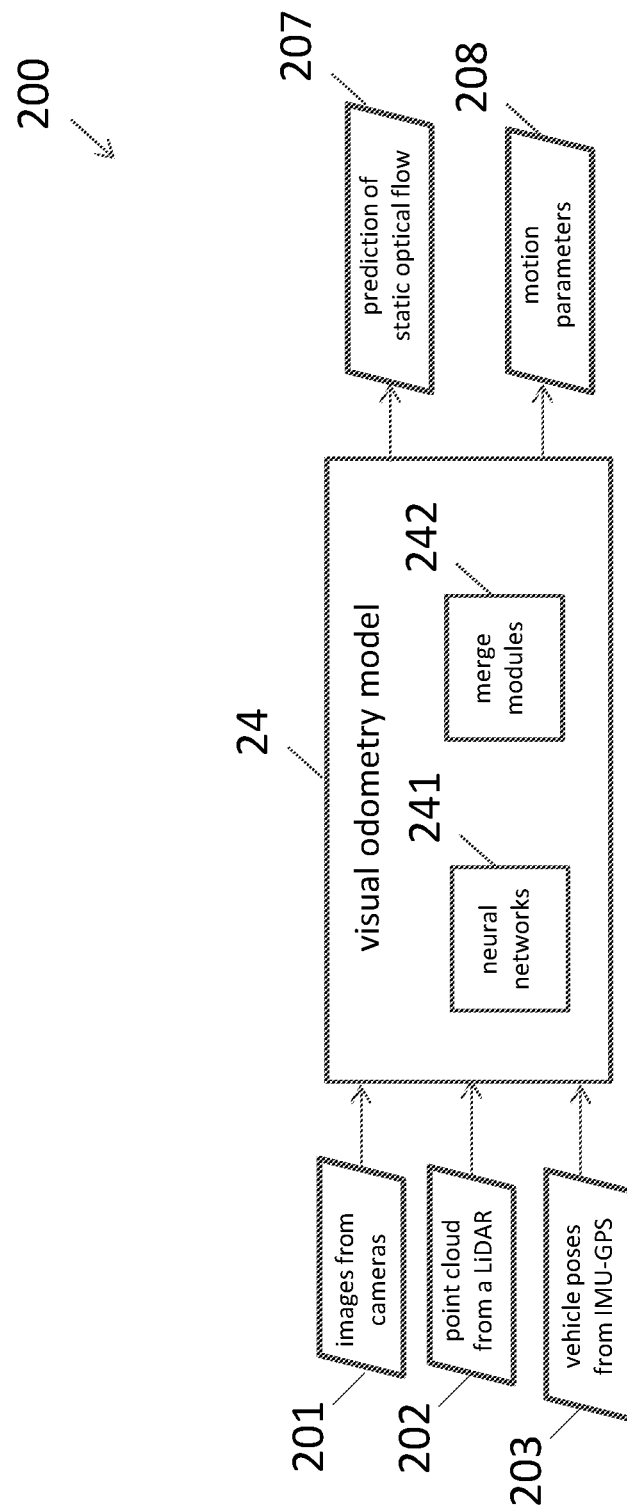
FIG. 2 is a block diagram of a system for visual odometry, in accordance with an embodiment.

FIG. 2 is a block diagram of a system 200 for visual odometry, in accordance with an embodiment.

Referring to FIG. 2, the system 200 includes a visual odometry model 24. The visual odometry model 24 includes one or more neural networks 241 and one or more merge modules 242. The neural networks may further include convolution neural networks (CNNs), deconvolution neural networks (DNNs) and a recurrent neural network (RNN). Moreover, the merge modules may include merge layers in the neural networks. In operation, the visual odometry model 24 receives images 201 from a camera and point clouds 202 from a LiDAR. Given vehicle poses 203 from an IMU-GPS module, the images 201 and the point clouds 202 are trained in the visual odometry model 24. The images 201, input in pair to the visual odometry model 24, are matched against the point clouds 202. The visual odometry model 24, in response to the images 201 and point clouds 202, generates a prediction of static optical flow 207 and a set of motion parameters 208, which in turn may be used to train the visual odometry model 24.

Figure 3A:
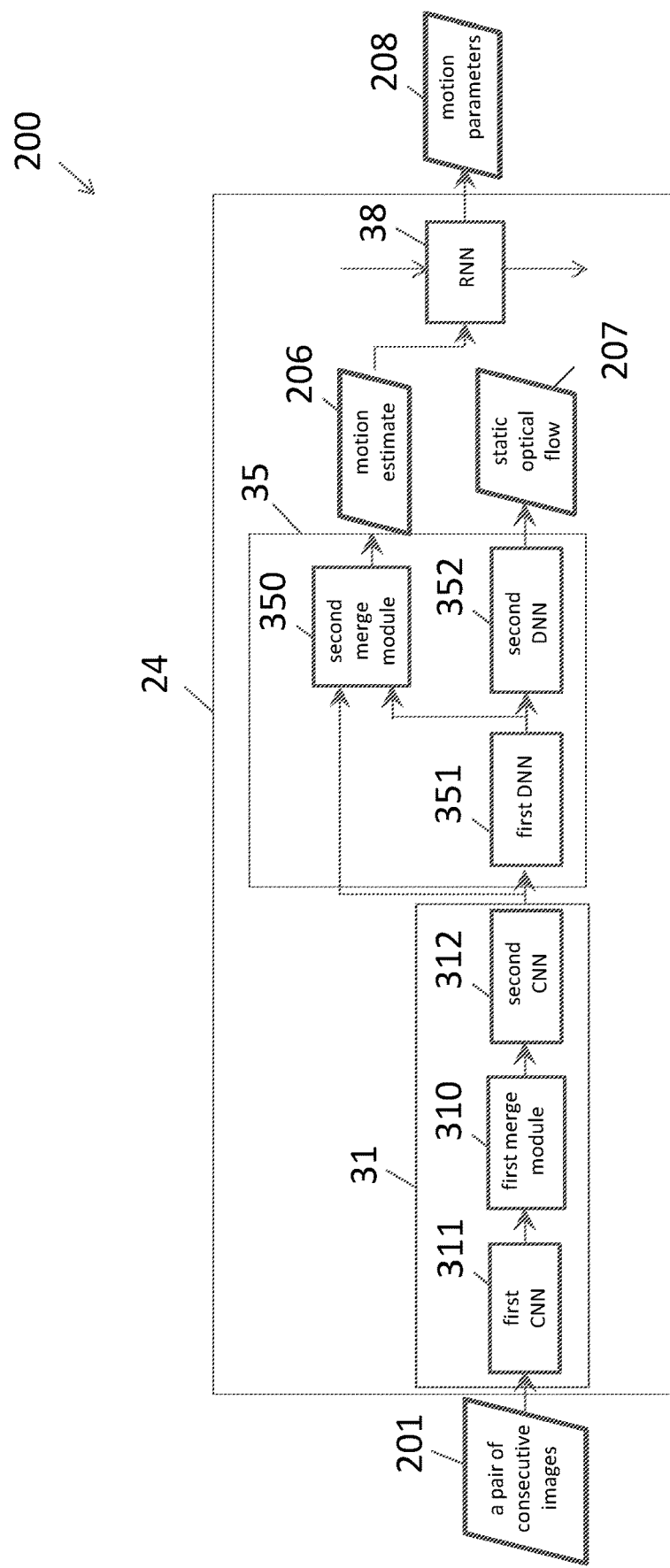
FIG. 3A is a block diagram showing the system illustrated in FIG. 2 in more detail.

FIG. 3A is a block diagram showing the system 200 illustrated in FIG. 2 in more detail.

Referring to FIG. 3A, the visual odometry model 24 in the system 200 includes a first neural network 31, a second neural network 35 and a third neural network 38. The first neural network 31 further includes a first CNN 311, a second CNN 312, and a first merge module 310 between the first CNN 311 and the second CNN 312. The first CNN 311 is configured to, in response to a pair of consecutive image frames 201, extract representative features from the pair of consecutive image frames 201. The first merge module 310 is configured to merge the representative features. In an embodiment, the representative features are merged by a patch-wise correlation, which is similar to that described in "Flownet: Learning Optical Flow with Convolutional Networks" by Fischer et. al., arXiv preprint arXiv:1504.06852 (hereinafter referred to as "the reference"). In another embodiment, the representative features are merged by a simple concatenation. The second CNN 312 then decreases the feature map size. An output of the second CNN 312 constitutes a portion of a motion estimate 206.

The second neural network 35 further includes a first DNN 351, a second DNN 352 and a second merge module 350. The first DNN 351 is configured to, in response to an output from the second CNN 312, generate a first flow output for each layer at a first resolution. The first flow output, which may have a relatively low resolution, constitutes another portion of the motion estimate 206. The second merge module 350 is configured to, in response to the output from the second CNN 312 and the first flow output from the first DNN 351, merge these outputs by, for example, a patch-wise correlation or alternatively a simple concatenation as previously discussed, resulting in the motion estimate 206. The second DNN 352 is configured to, in response to the first flow output from the first DNN 351, generate a first flow output for each layer at a second flow output for each layer at a second resolution. The second resolution is higher than the first resolution. The second flow output, which may have a relatively high resolution, serves as a static scene optical flow.

The third neural network 38 includes an RNN. RNN refers to a general type of neural network where the layers operate not only on the input data but also on delayed versions of hidden layers and/or output. In this manner, RNN has an internal state which it can use as a "memory" to keep track of past inputs and its corresponding decisions. In an embodiment, the third neural network 38 includes a Long Short-Term Memory (LSTM) architecture. The LSTM architecture is employed to allow RNN to learn longer-term trends. This is accomplished through the inclusion of gating cells which allow the neural network to selectively store and "forget" memories. The third neural network 38 is configured to, in response to the motion estimate 206 from the second merge module 350 and a set of motion parameters associated with an immediately previous pair of consecutive image frames (shown in FIG. 3B), generate a set of motion parameters 208 for the current pair of image frames 201.

Figure 3B:
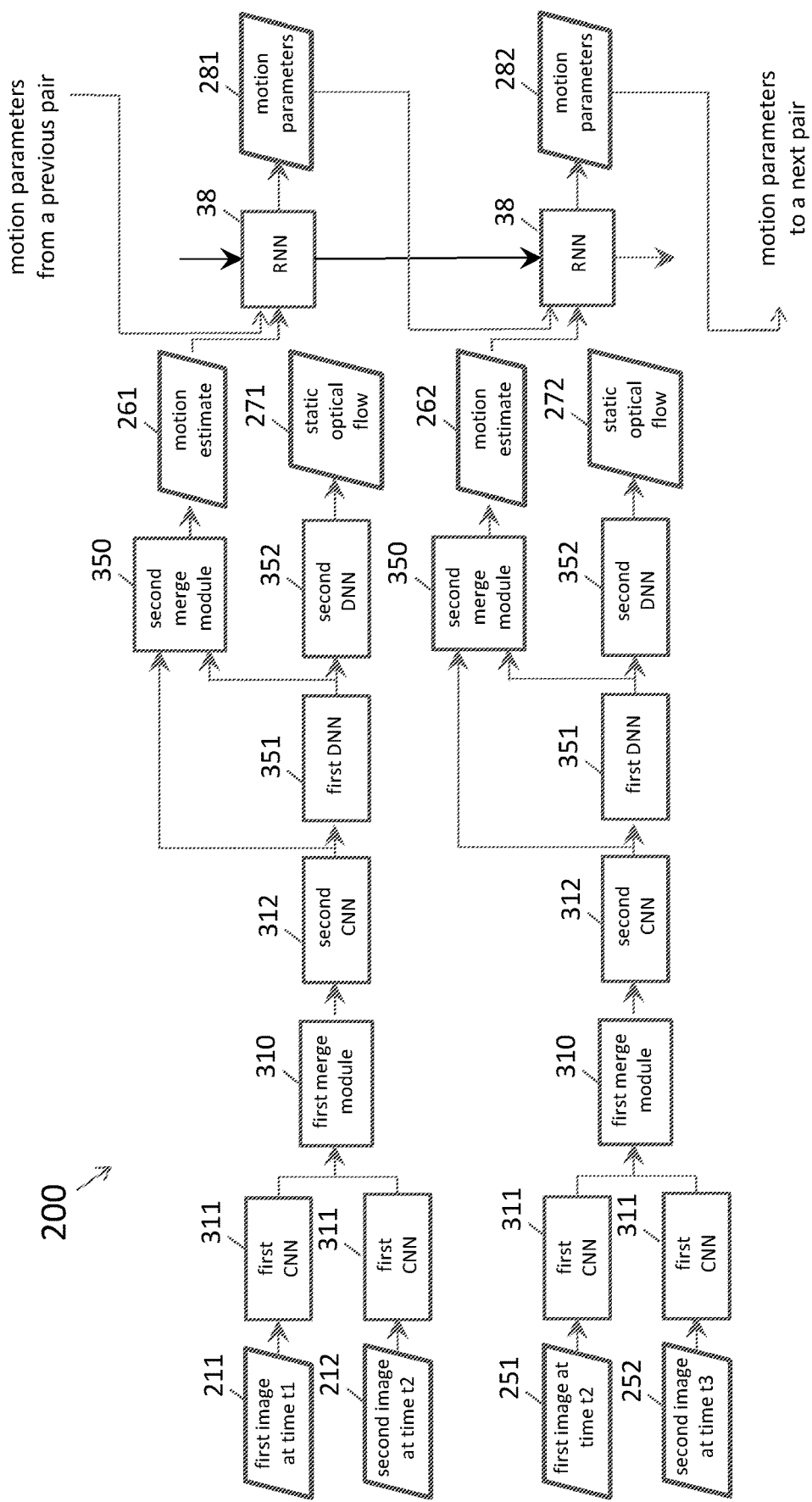
FIG. 3B is a schematic block diagram showing operation of the system illustrated in FIG. 3A.

FIG. 3B is a schematic block diagram showing operation of the system 200 illustrated in FIG. 3A.

Referring to FIG. 3B, the first CNN 311 receives a first image 211 of a first pair of consecutive image frames 201 at time t1, and extracts representative features from the first image 211 of the first pair 201. Subsequently, the first CNN 311 receives a second image 212 of the first pair 201 at time t2, and extracts representative features from the second image 212 of the first pair 201. The extracted representative features are merged by the first merge module 310 and the merged features are reduced in feature map size by the second CNN 312. Next, the first DNN 351 generates a low-resolution flow output based on the output of the second CNN 312. The second merge module 350 generates a first motion estimate 261 by merging the output of the second CNN 312 and the low-resolution flow output of the first DNN 351. The second DNN 352 generates a first static scene optical flow 271 based on the low-resolution flow output of the first DNN 351. The RNN 38 generates a first set of motion parameters 281 based on the first motion estimate 261 and a set of motion parameters associated with an immediately previous pair of consecutive image frames.

Similarly, the first CNN 311 receives a first image 251 of a second pair of consecutive image frames at the time t2, and extracts representative features from the first image 251 of the second pair. Subsequently, the first CNN 311 receives a second image 252 of the second pair at time t3, and extracts representative features from the second image 252 of the second pair. The extracted representative features are merged by the first merge module 310 and the merged features are reduced in feature map size by the second CNN 312. Next, the first DNN 351 generates a low-resolution flow output based on the output of the second CNN 312. The second merge module 350 generates a second motion estimate 262 by merging the output of the second CNN 312 and the low-resolution flow output of the first DNN 351. The second DNN 352 generates a second static scene optical flow 272 based on the low-resolution flow output of the first DNN 351. The RNN 38 generates a second set of motion parameters 282 based on the second motion estimate 262 and a set of motion parameters 281 associated with the first pair of consecutive image frames 201.

In some existing approaches, hand-crafted features are employed to extract keypoints and descriptors, and find matching points to solve motion parameters. Such feature-based approaches may fail when the scene has no salient keypoints. In the present disclosure, an end-to-end trained deep network is employed for estimating motion parameters. Sequence learning sub-network can eliminate accumulated errors. Flow is used to enhance motion estimation because motion has a strong connection with flow. The method according to the present disclosure allows the visual odometry model to have higher generalization ability. Since the whole network is end-to-end trained, no hand-crafted features are required. The network suits well for new scenarios or scenes, while feature-based methods fail in new scenarios and redesign of features costs a lot of efforts and time. As a result, the deep network is well suited to large amount of data because the model capacity and totally learned model can handle big data well. Since the price of GPS devices goes down, GPS signals can be added to the deep network. Also, other signals can be added into the model. The present disclosure proposes a flow prediction for predicting motion, and employs flow as additional information to enhance motion estimation. In addition, the designed structure can easily fuse additional signals, such as GPS signals.

Figure 4:
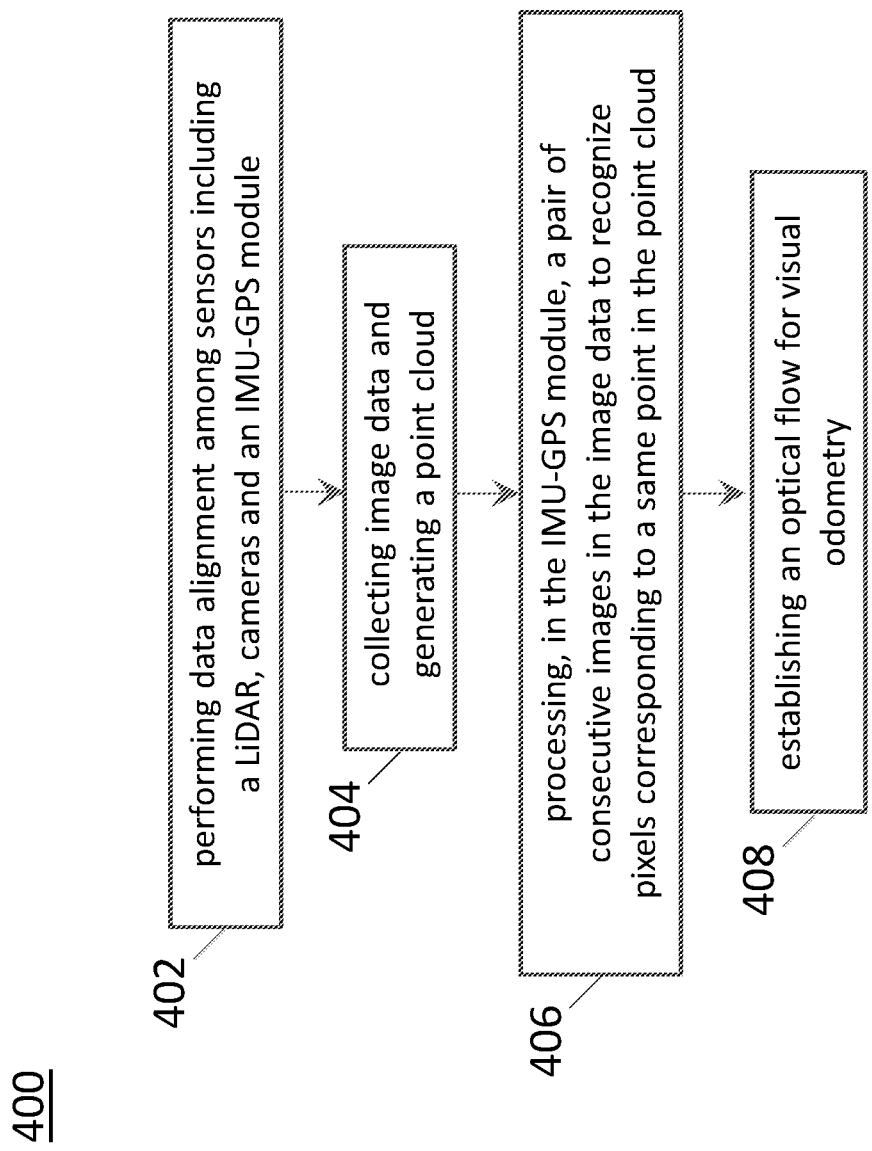
FIG. 4 is a flow diagram showing a method for visual odometry, in accordance with still another embodiment.

FIG. 4 is a flow diagram showing a method 400 for visual odometry, in accordance with still another embodiment.

Referring to FIG. 4, in operation 402, data alignment among sensors including a LiDAR, cameras and an inertia navigation module such as an IMU-GPS module is performed.

In operation 404, image data are obtained from the camera and point clouds are obtained from the LiDAR.

In operation 406, in the IMU-GPS module, a pair of consecutive images in the image data is processed to recognize pixels corresponding to a same point in the point clouds.

Subsequently, in operation 408, an optical flow for visual odometry is established.

In this way, with the aid of LiDAR data whose accuracy improves a learning process by increasing the IMU-GPS module's ability to accurately spot pixels in a pair of consecutive image frames, the IMU-GPS module is learning to establish an optical flow every time it processes image data and generates a more precise optical flow. Consequently, with sufficient training, the IMU-GPS module is able to generate precise optical flows reflecting movement of a vehicle.

Figure 5:
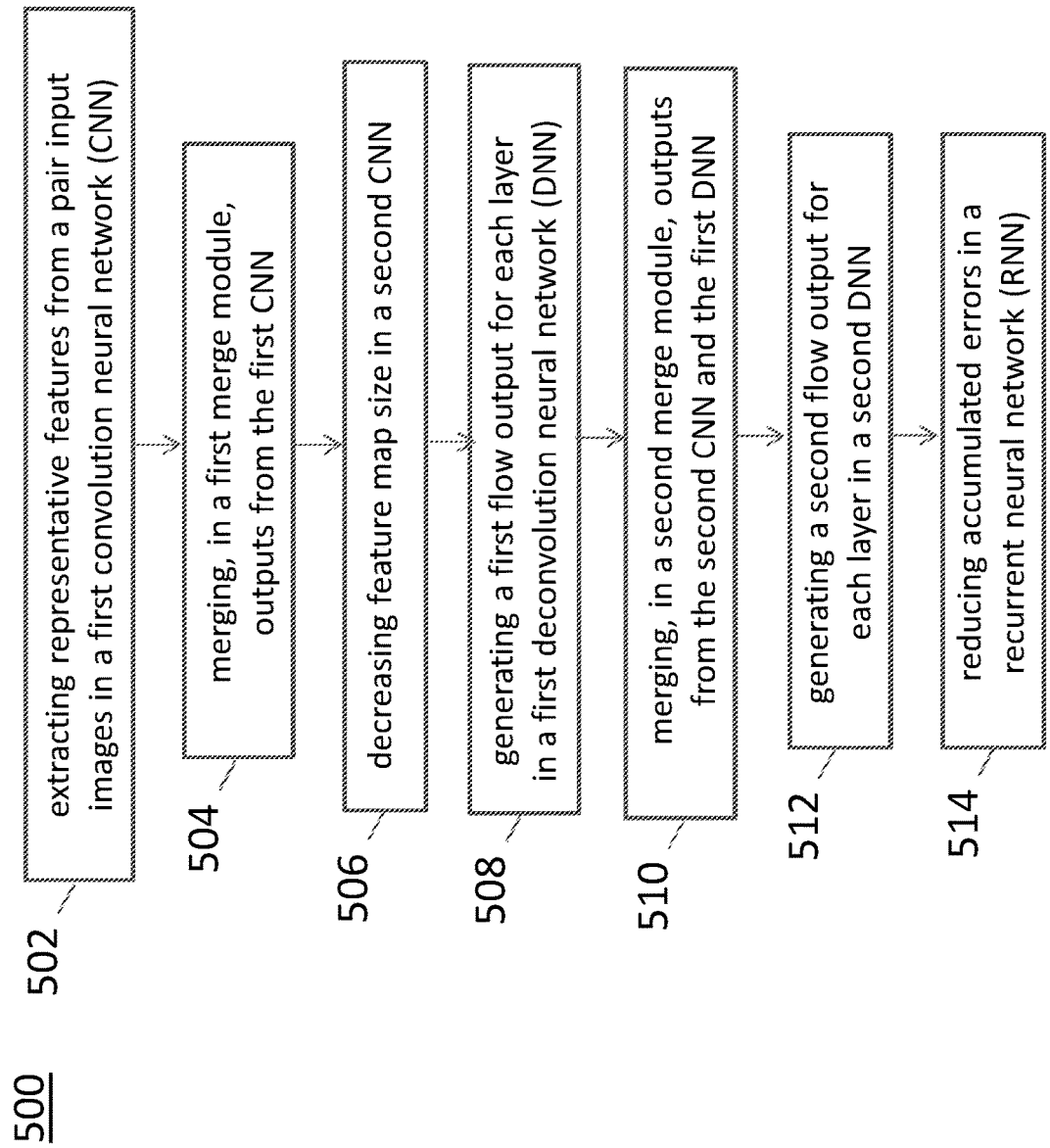
FIG. 5 is a flow diagram showing a method for visual odometry, in accordance with yet another embodiment.

FIG. 5 is a flow diagram showing a method 500 for visual odometry, in accordance with yet another embodiment.

Referring to FIG. 5, in operation 502, representative features from a pair input images are extracted in a first convolution neural network (CNN).

In operation 504, outputs from the first CNN are merged in a first merge module. The outputs include the representative features of a first image of the pair and the representative features of a second image of the pair. Moreover, the merge may be achieved by a patch-wise correlation or a simple concatenation.

Next, in operation 506, the merged features are reduced in feature map size in a second CNN. The output of the second CNN constitutes a portion of a motion estimate.

In operation 508, a first flow output for each layer is generated in a first deconvolution neural network (DNN) at a first resolution. In an embodiment, the first flow output has a relatively low resolution. The first flow output constitutes another portion of the motion estimate.

In operation 510, outputs from the second CNN and the first DNN are merged in a second merge module, resulting in a motion estimate.

In operation 512, a second flow output for each layer is generated in a second DNN at a second resolution higher than the first resolution. In an embodiment, the second flow output has a relatively high resolution and serves as a static scene optical flow.

In operation 514, accumulated errors are reduced in a recurrent neural network (RNN). The RNN, by sequence learning and prediction, generates a set of motion parameters for estimating motion between the pair of consecutive input images.

Figure 6:
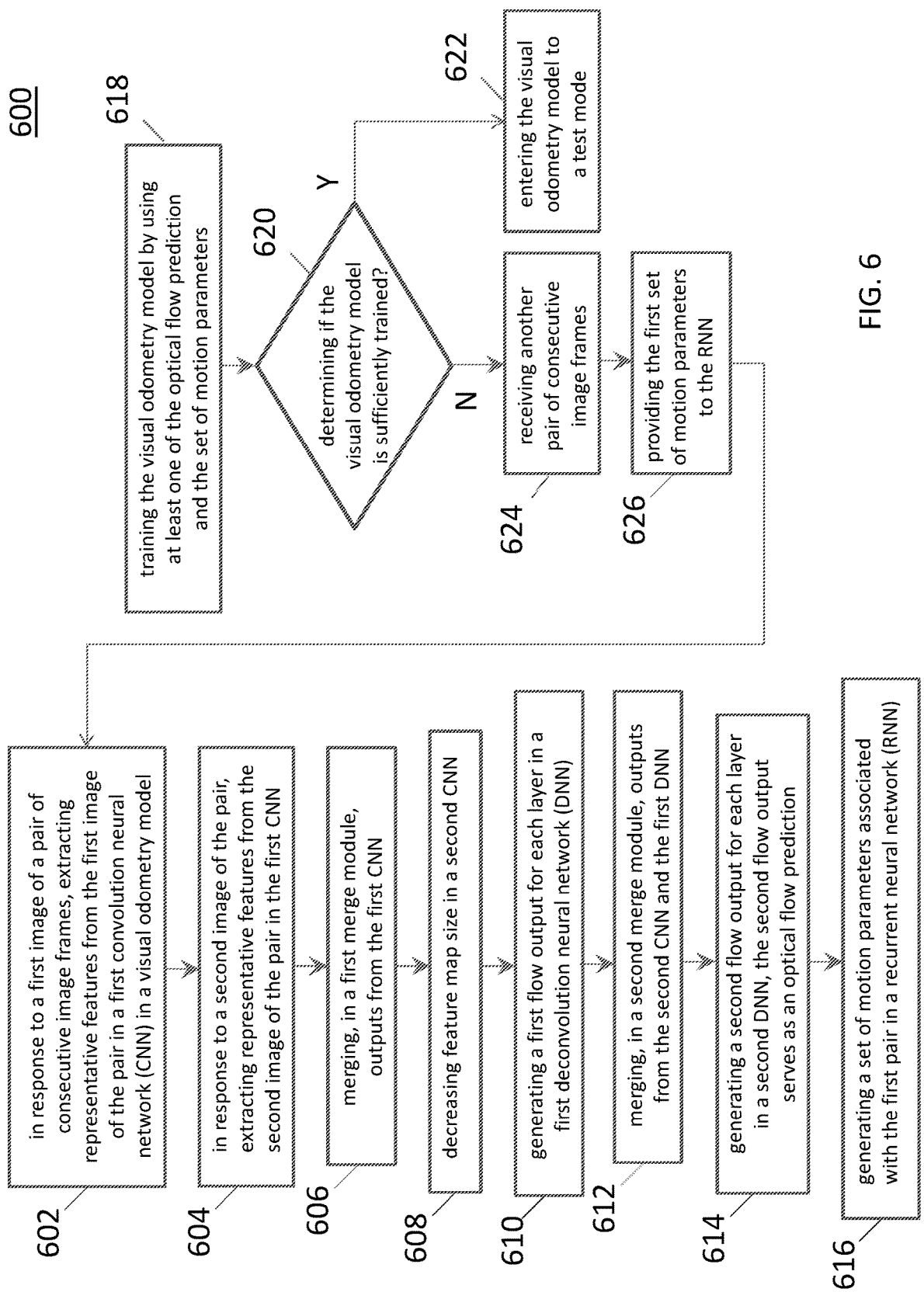
FIG. 6 is a flow diagram showing a method of visual odometry, in accordance with yet still another embodiment.

FIG. 6 is a flow diagram showing a method 600 of visual odometry, in accordance with yet still another embodiment.

Referring to FIG. 6, in operation 602, in response to a first image of a pair of consecutive image frames, representative features are extracted from the first image of the pair in a first convolution neural network (CNN) in a visual odometry model.

Next, in operation 604, in response to a second image of the pair, representative features are extracted from the second image of the pair in the first CNN.

In operation 606, outputs from the first CNN are merged in a first merge module.

In operation 608, merged features are reduced in feature map size in a second CNN.

In operation 610, a first flow output for each layer is generated in a first deconvolution neural network (DNN).

In operation 612, outputs from the second CNN and the first DNN are then merged in a second merge module.

Next, in operation 614, a second flow output for each layer is generated in a second DNN. The second flow output serves as an optical flow prediction.

In operation 616, a set of motion parameters associated with the first pair is generated in a recurrent neural network (RNN) in response to the motion estimate from the second merge module and a set of motion parameters associated with an immediately previous pair of input images.

In operation 618, the visual odometry model is trained by using at least one of the optical flow prediction and the set of motion parameters.

In operation 620, it is determined if the visual odometry model is sufficiently trained. If affirmative, in operation 622, the trained visual odometry model may enter a test mode. If not, then in operation 624, another pair of consecutive image frames is received. Moreover, in operation 626, the first set of motion parameters is provided to the RNN.

Figure 7:
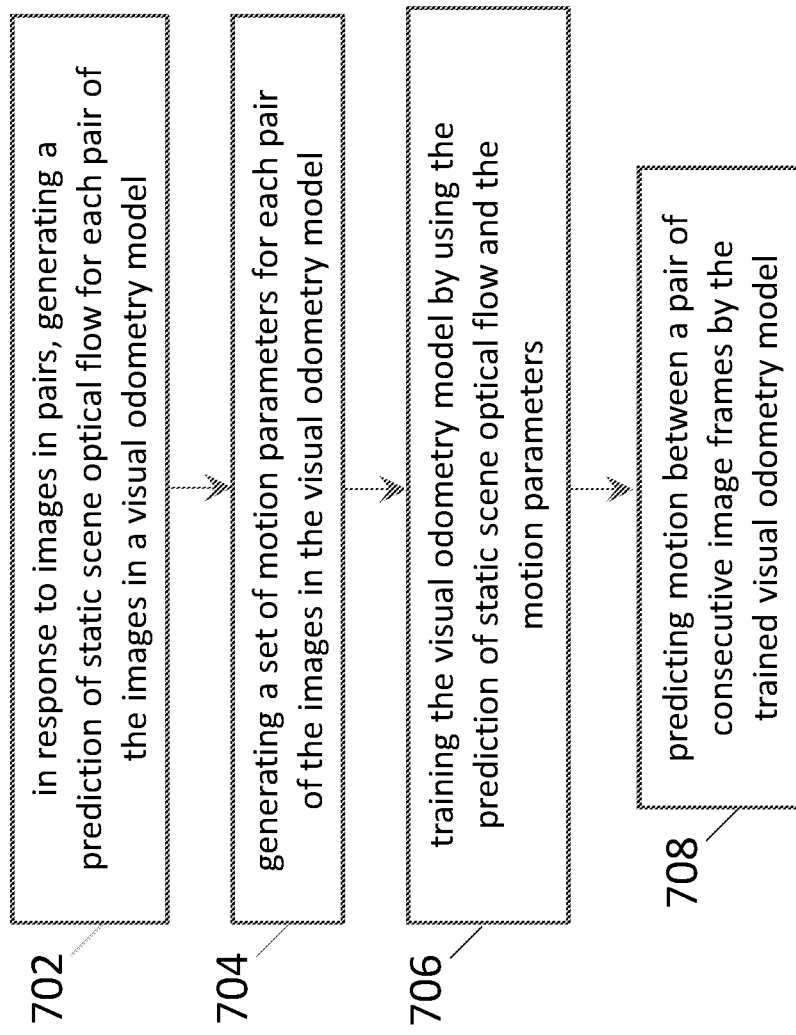
FIG. 7 is a flow diagram showing a method of visual odometry, in accordance with a further embodiment.

FIG. 7 is a flow diagram showing a method 700 of visual odometry, in accordance with a further embodiment.

Referring to FIG. 7, in operation 702, in response to images in pairs, a prediction of static scene optical flow for each pair of the images is generated in a visual odometry model through deep learning.

In operation 704, a set of motion parameters for each pair of the images is generated in the visual odometry model.

In operation 706, the visual odometry model is trained by using the prediction of static scene optical flow and the motion parameters.

In operation 708, motion between a pair of consecutive image frames is predicted by the trained visual odometry model.

Figure 8A:
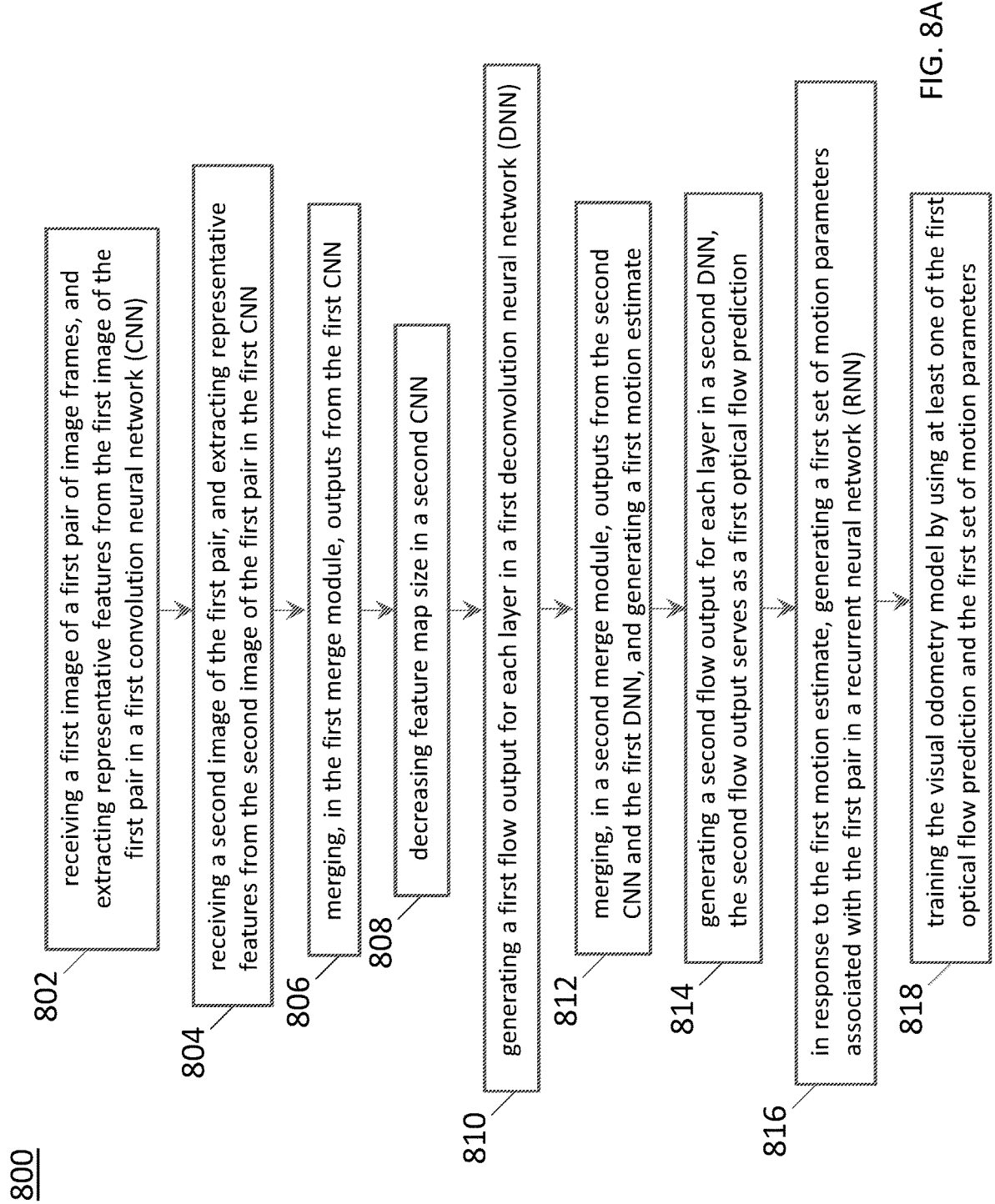

FIGS. 8A and 8B are flow diagrams showing a method 800 of visual odometry, in accordance with a still further embodiment.

Referring to FIG. 8A, in operation 802, a first image of a first pair of image frames is received, and representative features are extracted from the first image of the first pair in a first convolution neural network (CNN).

In operation 804, a second image of the first pair is received, and representative features are extracted from the second image of the first pair in the first CNN.

In operation 806, outputs from the first CNN are merged in the first merge module.

In operation 808, the merged features are decreased in feature map size in a second CNN.

In operation 810, a first flow output for each layer is generated in a first deconvolution neural network (DNN).

In operation 812, outputs from the second CNN and the first DNN are merged in a second merge module, resulting in a first motion estimate.

In operation 814, a second flow output for each layer is generated in a second DNN. The second flow output serves as a first optical flow prediction.

In operation 816, in response to the first motion estimate, a first set of motion parameters associated with the first pair is generated in a recurrent neural network (RNN).

Subsequently, in operation 818, the visual odometry model is trained by using at least one of the first optical flow prediction and the first set of motion parameters.

Referring to FIG. 8B, in operation 822, a first image of a second pair of image frames is received, and representative features are extracted from the first image of the second pair in the first CNN.

In operation 824, a second image of the second pair is received, and representative features are extracted from the second image of the second pair in the first CNN.

In operation 826, outputs from the first CNN are merged in the first merge module.

In operation 828, the merged features are decreased in feature map size in the second CNN.

In operation 830, a first flow output for each layer is generated in the first DNN.

In operation 832, outputs from the second CNN and the first DNN are merged in the second merge module, resulting in a second motion estimate.

In operation 834, a second flow output for each layer is generated in the second DNN. The second flow output serves as a second optical flow prediction.

In operation 836, in response to the second motion estimate and the first set of motion parameters, a second set of motion parameters associated with the second pair is generated in the RNN.

In operation 838, the visual odometry model is trained by using at least one of the second optical flow prediction and the second set of motion parameters.

FIG. 9 is a block diagram of a system 900 for generating a ground truth dataset for motion planning, in accordance with some embodiments.

Referring to FIG. 9, the system 900 includes a processor 901, an computer server 902, a network interface 903, an input and output (I/O) device 905, a storage device 907, a memory 909, and a bus or network 908. The bus 908 couples the network interface 903, the I/O device 905, the storage device 907 and the memory 909 to the processor 901.

Accordingly, the processor 901 is configured to enable the computer server 902, e.g., Internet server, to perform specific operations disclosed herein. It is to be noted that the operations and techniques described herein may be implemented, at least in part, in hardware, software, firmware, or any combination thereof. For example, various aspects of the described embodiments, e.g., the processor 901, the computer server 902, or the like, may be implemented within one or more processing units, including one or more microprocessing units, digital signal processing units (DSPs), application specific integrated circuits (ASICs), field programmable gate arrays (FPGAs), or any other equivalent integrated or discrete logic circuitry, as well as any combinations of such components.

The term "processing unit" or "processing circuitry" may generally refer to any of the foregoing logic circuitry, alone or in combination with other logic circuitry, or any other equivalent circuitry. A control unit including hardware may also perform one or more of the techniques of the present disclosure.

In some embodiments in accordance with the present disclosure, the computer server 902 is configured to utilize the I/O port 905 communicate with external devices via a network 908, such as a wireless network. In certain embodiments, the I/O port 905 is a network interface component, such as an Ethernet card, an optical transceiver, a radio frequency transceiver, or any other type of device that can send and receive data from the Internet. Examples of network interfaces may include Bluetooth®, 3G and WiFi® radios in mobile computing devices as well as USB. Examples of wireless networks may include WiFi®, Bluetooth®, and 3G. In some embodiments, the internet server 902 is configured to utilize the I/O port 905 to wirelessly communicate with a client device 910, such as a mobile phone, a tablet PC, a portable laptop or any other computing device with internet connectivity. Accordingly, electrical signals are transmitted between the computer server 900 and the client device 910.

In some embodiments in accordance with the present disclosure, the computer server 902 is a virtual server capable of performing any function a regular server has. In certain embodiments, the computer server 900 is another client device of the system 900. In other words, there may not be a centralized host for the system 900, and the client devices 910 in the system are configured to communicate with each other directly. In certain embodiments, such client devices 910 communicate with each other on a peer-to-peer (P2P) basis.

The processor 901 is configured to execute program instructions that include a tool module configured to perform a method as described and illustrated with reference to FIGS. 1, 4 through 7, 8A and 8B. Accordingly, the tool module is configured to execute the operations including: performing data alignment among sensors including a LiDAR, cameras and an IMU-GPS module; collecting image data and generating point clouds; processing, in the IMU-GPS module, a pair of consecutive images in the image data to recognize pixels corresponding to a same point in the point clouds; and establishing an optical flow for visual odometry.

The network interface 903 is configured to access program instructions and data accessed by the program instructions stored remotely through a network (not shown).

The I/O device 905 includes an input device and an output device configured for enabling user interaction with the system 900. In some embodiments, the input device comprises, for example, a keyboard, a mouse, and other devices. Moreover, the output device comprises, for example, a display, a printer, and other devices.

The storage device 907 is configured for storing program instructions and data accessed by the program instructions.

In some embodiments, the storage device 907 comprises, for example, a magnetic disk and an optical disk.

The memory 909 is configured to store program instructions to be executed by the processor 901 and data accessed by the program instructions. In some embodiments, the memory 909 comprises a random access memory (RAM) and/or some other volatile storage device and/or read only memory (ROM) and/or some other non-volatile storage device including other programmable read only memory (PROM), erasable programmable read only memory (EPROM), electronically erasable programmable read only memory (EEPROM), flash memory, a hard disk, a solid state drive (SSD), a compact disc ROM (CD-ROM), a floppy disk, a cassette, magnetic media, optical media, or other computer readable media. In certain embodiments, the memory 909 is incorporated into the processor 901.

Thus, specific embodiments and applications have been disclosed. It should be apparent, however, to those skilled in the art that many more modifications besides those already described are possible without departing from the disclosed concepts herein. The embodiment, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the embodiment.

What is claimed is:

1. A method of visual odometry for a non-transitory computer readable storage medium storing one or more programs, the one or more programs comprising instructions, which when executed by a computing device, causes the computing device to perform the following steps comprising:

performing data alignment among sensors including a light detection and ranging (LiDAR) sensor, cameras, and an IMU-GPS module;

collecting image data and generating point clouds;

processing a pair of consecutive images in the image data to recognize pixels corresponding to a same point in the point clouds;

establishing an optical flow for visual odometry;

receiving a first image of a first pair of image frames, and extracting representative features from the first image of the first pair in a first convolution neural network (CNN);

receiving a second image of the first pair, and extracting representative features from the second image of the first pair in the first CNN;

merging, in a first merge module, outputs from the first CNN;

decreasing feature map size in a second CNN;
generating a first flow output for each layer in a first deconvolution neural network (DNN); and
merging, in a second merge module, outputs from the second CNN and the first DNN to generate a first motion estimate.

2. The method according to claim 1 further comprising:
generating a second flow output for each layer in a second DNN, the second flow output serves as a first optical flow prediction.

3. The method according to claim 2 further comprising:
in response to the first motion estimate, generating a first set of motion parameters associated with the first pair in a recurrent neural network (RNN).

4. The method according to claim 3 further comprising:
training the visual odometry model by using at least one of the first optical flow prediction and the first set of motion parameters.

5. A method of visual odometry for a non-transitory computer readable storage medium storing one or more programs, the one or more programs comprising instructions, which when executed by a computing device, causes the computing device to perform the following steps comprising:
performing data alignment among sensors including a light detection and ranging (LiDAR) sensor, cameras and an IMU-GPS module;
collecting image data and generating point clouds;
processing a pair of consecutive images in the image data to recognize pixels corresponding to a same point in the point clouds;
establishing an optical flow for visual odometry;
receiving a first image of a second pair of image frames, and extracting representative features from the first image of the second pair in a first convolutional neural network (CNN);
receiving a second image of the second pair, and extracting representative features from the second image of the second pair in the first CNN;
merging, in a first merge module, outputs from the first CNN;
decreasing feature map size in a second CNN; and
generating a first flow output for each layer in a first deconvolutional neural network (DNN); and
merging, in the second merge module, outputs from the second CNN and the first DNN to generate a second motion estimate.

6. The method according to claim 5 further comprising:
generating a second flow output for each layer in the second DNN, the second flow output serves as a second optical flow prediction.

7. The method according to claim 6 further comprising:
in response to the second motion estimate and the first set of motion parameters, generating a second set of motion parameters associated with the second pair in the RNN.

8. The method according to claim 7 further comprising:
training the visual odometry model by using at least one of the second optical flow prediction and the second set of motion parameters.

9. A system for visual odometry, the system comprising:
an interne server, comprising:
an I/O port, configured to transmit and receive electrical signals to and from a client device;
a memory;
one or more processing units; and
one or more programs stored in the memory and configured for execution by the one or more processing units, the one or more programs including instructions for:
performing data alignment among sensors including a light detection and ranging (LiDAR) sensor, cameras and an IMU-GPS module;
collecting image data and generating point clouds;
processing, in the IMU-GPS module, a pair of consecutive images in the image data to recognize pixels corresponding to a same point in the point clouds;
establishing an optical flow for visual odometry;
receiving a first image of a first pair of image frames, and extracting representative features from the first image of the first pair in a first convolution neural network (CNN);
receiving a second image of the first pair and extracting representative features from the second image of the first pair in the first CNN;
merging, in a first merge module, outputs from the first CNN;
decreasing a feature map size in a second CNN;
generating a first flow output for each layer in a first deconvolution neural network (DNN); and
merging, in a second merge module, outputs from the second CNN and the first DNN to generate a first motion estimate.

10. The system according to claim 9 further comprising:
generating a second flow output for each layer in a second DNN, the second flow output serves as a first optical flow prediction.

11. The system according to claim 10 further comprising:
in response to the first motion estimate, generating a first set of motion parameters associated with the first pair in a recurrent neural network (RNN).

12. The system according to claim 11 further comprising:
training the visual odometry model by using at least one of the first optical flow prediction and the first set of motion parameters.

13. A system for visual odometry, the system comprising:
an interne server, comprising:
an I/O port, configured to transmit and receive electrical signals to and from a client device;
a memory;
one or more processing units; and
one or more programs stored in the memory and configured for execution by the one or more processing units, the one or more programs including instructions for:
performing data alignment among sensors including a light detection and ranging (LiDAR) sensor, cameras and an IMU-GPS module;
collecting image data and generating point clouds;
processing, in the IMU-GPS module, a pair of consecutive images in the image data to recognize pixels corresponding to a same point in the point clouds;
establishing an optical flow for visual odometry;
receiving a first image of a second pair of image frames, and extracting representative features from the first image of the second pair in a first convolution neural network (CNN); and
receiving a second image of the second pair and extracting representative features from the second image of the second pair in the first CNN;
merging, in a first merge module, outputs from the first CNN;
decreasing feature map size in a second CNN;
generating a first flow output for each layer in a first deconvolutional neural network (DNN); and merging, in the second merge module, outputs from the second CNN and the first DNN to generate a second motion estimate.

14. The system according to claim 13 further comprising:
generating a second flow output for each layer in the second DNN, the second flow output serves as a second optical flow prediction.

15. The system according to claim 14 further comprising:
in response to the second motion estimate and the first set of motion parameters, generating a second set of motion parameters associated with the second pair in the RNN.

16. The system according to claim 15 further comprising:
training the visual odometry model by using at least one of the second optical flow prediction and the second set of motion parameters.

\* \* \* \* \*

UNITED STATES PATENT AND TRADEMARK OFFICE
CERTIFICATE OF CORRECTION

PATENT NO. : 10,552,979 B2
APPLICATION NO. : 15/703885
DATED : February 4, 2020
INVENTOR(S) : Wentao Zhu et al.

Page 1 of 1

It is certified that error appears in the above-identified patent and that said Letters Patent is hereby corrected as shown below:

On the Title Page

On Page 3, item (56), under "OTHER PUBLICATIONS", in Column 2, Line 6, delete "{CVPR)," and insert -- (CVPR), --, therefor.

On Page 3, item (56), under "OTHER PUBLICATIONS", in Column 2, Line 56, delete "{CVPR)," and insert -- (CVPR), --, therefor.

On Page 4, item (56), under "OTHER PUBLICATIONS", in Column 1, Line 20, delete "Sames"," and insert -- Games", --, therefor.

In the Specification

In Column 1, Lines 60-61, delete "of embodiments of the embodiment," and insert -- of the embodiment, --, therefor.

In Column 12, Line 59, delete "an computer" and insert -- a computer --, therefor.

In the Claims

In Column 15, Line 43, in Claim 5, delete "CNN; and" and insert -- CNN; --, therefor.

In Column 15, Line 63, in Claim 9, delete "interne" and insert -- internet --, therefor.

In Column 16, Line 40, in Claim 13, delete "interne" and insert -- internet --, therefor.

Signed and Sealed this
Thirtieth Day of June, 2020

Andrei Iancu
*Director of the United States Patent and Trademark Office*